A. BURGER & J. GOMINSKY.
GRAIN HARVESTER.
APPLICATION FILED APR. 22, 1909.

955,249.

Patented Apr. 19, 1910.
5 SHEETS—SHEET 5.

Witnesses
James F. Crown
E. M. Ricketts

Inventors
Albert Burger
John Gominsky
By Watson E. Coleman
Attorney

UNITED STATES PATENT OFFICE.

ALBERT BURGER AND JOHN GOMINSKY, OF WATKINS, MINNESOTA.

GRAIN-HARVESTER.

955,249.     Specification of Letters Patent.     Patented Apr. 19, 1910.

Application filed April 22, 1909. Serial No. 491,488.

*To all whom it may concern:*

Be it known that we, ALBERT BURGER and JOHN GOMINSKY, citizens of the United States, residing at Watkins, in the county of Meeker and State of Minnesota, have invented certain new and useful Improvements in Grain-Harvesters, of which the following is a specification, reference being had to the accompanying drawings.

This invention relates to improvements in grain harvesters and more particularly to means for lifting fallen grain so that it may be effectively mowed by the cutting mechanism and carried to the binding mechanism.

One object of the invention is to provide a grain lifting mechanism of this character which will be simple and practical in construction and effective in operation, which will be automatic in operation but at the same time under the complete control of the driver or an operator of the machine, which when not needed may be secured in an inoperative position so that the harvester may operate the same as if the lifting mechanism was not upon it, and which may be made in the form of an attachment and readily applied to grain harvesting machines or binders in general use.

With the above and other objects in view, the invention consists of the novel features of construction and the combination and arrangement of parts hereinafter fully described and claimed, and illustrated in the accompanying drawings, in which—

In the drawings 1 denotes the main frame of a grain binder or harvester of well known form having the usual cutting mechanism 2 arranged to one side of the main frame, and the usual grain lifting mechanism 3 in rear of the cutting mechanism. The machine also has the usual bull wheel 4 from which the grain cutting, lifting and binding mechanisms are actuated, and also driven by said wheel 4 is a horizontal, transversely disposed shaft 5 which forms a part of the driving connection for the cutting mechanism. These parts, as well as the remaining parts of the machine shown but not described, are old and well known and form no part of the present invention.

The invention consists of a plurality of grain lifting arms 6 arranged to project forwardly in advance of the cutting mechanism 2 and having at their free front ends angularly disposed grain lifting fingers 7. The arms 6 have their rear ends so mounted and actuated that they swing vertically and at the same time are twisted axially to raise and lower the angular fingers 7, as hereinafter more fully explained. Each of the arms 6 has an enlarged rear end recessed to provide spaced portions 8, 9 which terminate in pivots 10, 11. The pivots 10 of the several arms are rotatably mounted in a rock shaft 12 disposed horizontally above the cutting mechanism 2, whereby the arms 6 swing vertically when the shaft is rocked and at the same time may turn or oscillate axially by reason of the pivots 10. The pivots 11 of the several arms 6 are mounted in a longitudinal connecting bar 13 whereby the arms will be simultaneously turned or oscillated axially in a manner presently explained. The rock shaft 12 has its outer end reduced and mounted in a bearing bracket 14 secured to the upper bar or plate of the cutting mechanism and the inner end of said shaft, which end extends under the roller 15 of the elevator apron 3, and partially across said frame, is rotatably mounted in a suitable bearing bracket 16.

While any suitable means may be provided for rocking the shaft 12, we preferably provide upon it adjacent to its inner end a crank arm 17 which is connected by a pitman 18 to the crank pin of a crank disk or wheel 19 fixed on one end of a shaft 20 journaled in a bearing bracket 21 suitably secured to the frame 1. The shaft 20 is driven from the shaft 5 by sprocket chain gearing 22 so that when the machine is drawn forwardly the shaft 20 will be rotated and the shaft 12 rocked or oscillated to raise and lower the lifting arms 6. The sprocket chain gearing 22 includes a sprocket wheel 22<sup>a</sup> which is loose on shaft 5 and adapted to be locked to the same for rotation therewith by means of a suitable clutch 22<sup>b</sup>, as shown in Fig. 1.

The connecting rod 13 may be reciprocated longitudinally by any suitable means for the purpose of axially oscillating or rocking the arms 6, but we preferably connect the inner end of said rod 13 by a pivoted link 23 to one end of a lever 24. The inner portion of the connecting rod 13 is offset to extend under the roller 15 and so that it will not contact said roller when the shaft 12 is rocked. Said lever 24 is pivoted intermediate its ends at 25 to the intermediate portion of the rock shaft 12, whereby said lever and rod 13 will rock vertically with the shaft 12 but may have independent movement longitudinally thereof. The link 23 is pivoted in the bifurcated forward end of the lever 24 and the free rear end of said lever is shaped to provide a substantially pyramidal-shaped head 26 to co-act with a frusto-pyramidal-shaped cam block 27 fixed stationary at a suitable point upon the main frame 1. Fixed to a bracket or other support 28 on the main frame is a leaf spring 29 the depending free end of which bears against a longitudinally curved surface 30 formed on one face of the lever 24 and extending on both sides of the fulcrum or pivot 25 of said lever. The spring 29 is relatively stationary so that when the shaft 12 rocks, the lever 24, which is carried by said shaft, will change its position with respect to said spring in order that the latter may actuate the two ends of the lever alternately in the same direction to move the end or head 26 of the lever horizontally across either the top or bottom face of the stationary cam 27. In the operation of these parts of the machine, the head 26 of the lever is adapted to travel around the stationary cam block 27, said lever being moved across the vertical side faces of the cam block by the oscillation of the rock shaft 12, and horizontally across the top and bottom faces of said cam block by the spring 29. To make the operation of these parts entirely clear, we will describe the operation step by step during one complete revolution of the crank disk 19.

Figure 1:
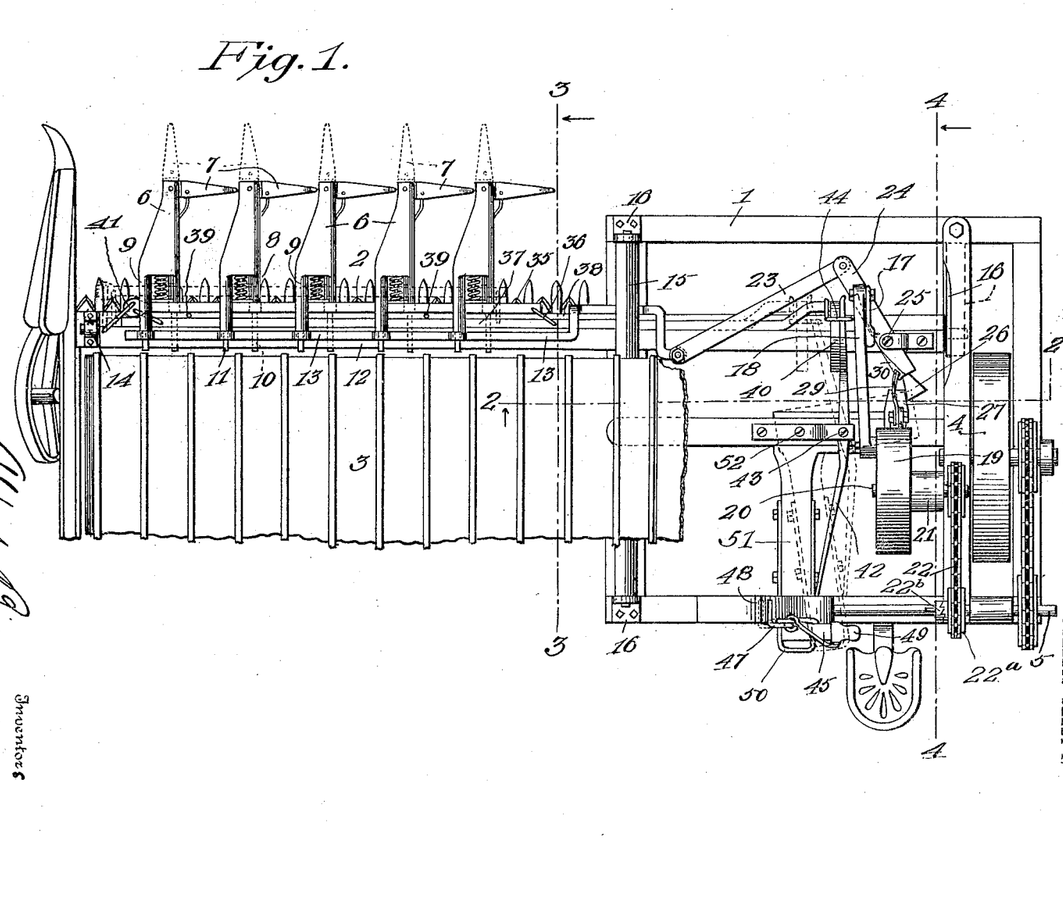
Figure 1 is a plan view of parts of an ordinary grain binder or harvester showing the application of the invention thereto, the embodiment of the invention illustrated being in the form of an attachment.
Figures 8, 9:
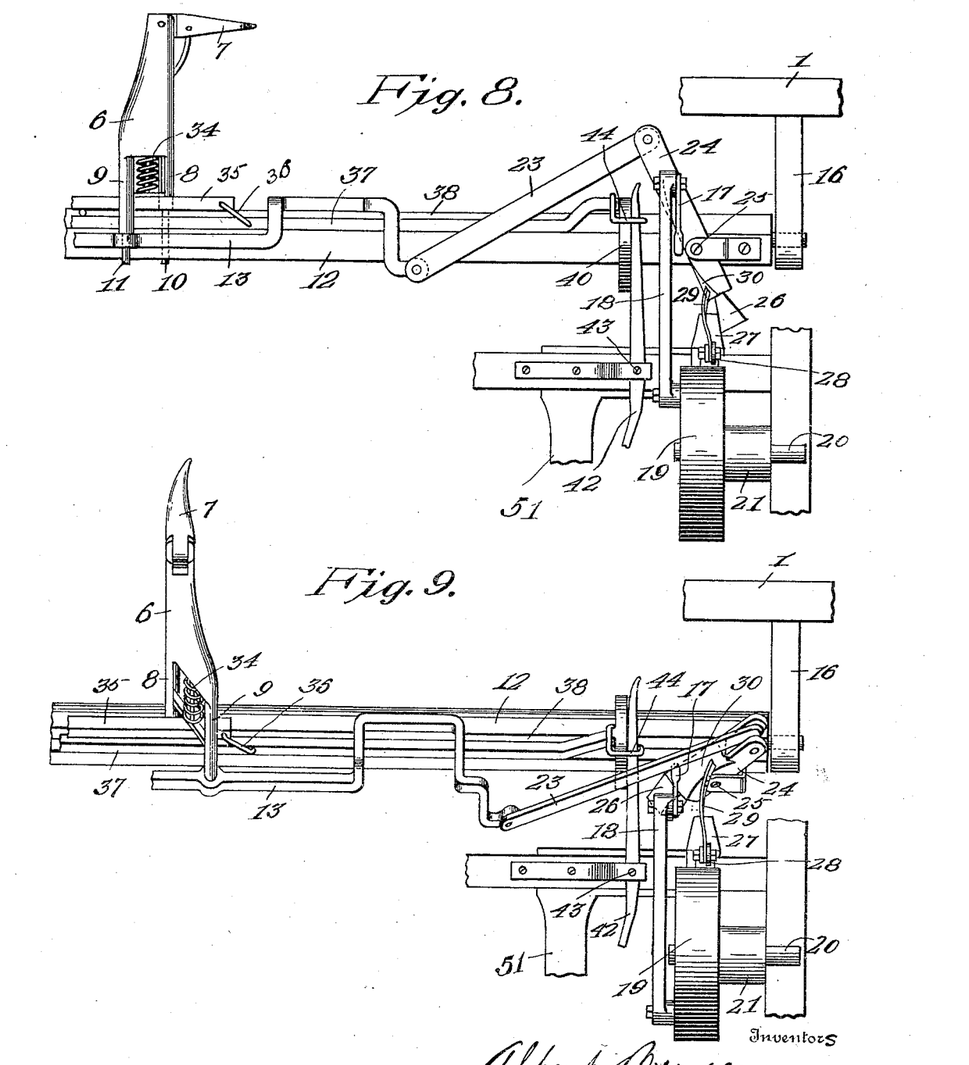
Figs. 8 and 9 are detail views showing the operation of the cam lever and stationary cam.
Figure 10:
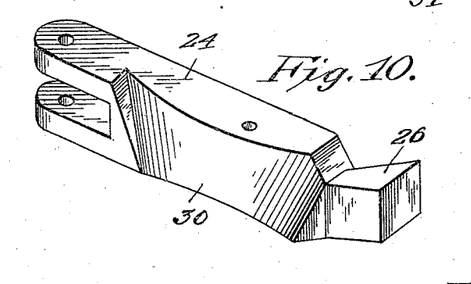
Fig. 10 is a detail perspective view of the cam lever.

Referring more particularly to Figs. 1, 8 and 9 of the drawing and assuming the grain lifting arms 6 to be in a lowered horizontal position and the head 26 of the lever to be at the right of the stationary cam 27, as shown in Fig. 1, it will be seen that as the machine moves forwardly the pin of the crank disk 19 will move downwardly and rearwardly from its position shown in Fig. 1 so that it will pull the pitman 18 in a rearward direction and cause the arm 17 to rock the shaft 12 rearwardly. This movement of the shaft causes the arms 6 to swing upwardly and rearwardly so that their fingers 7 will elevate the fallen grain. During this first half revolution of the crank disk 19 the arms 6 are elevated and the head 26 of the lever 24 is moved downwardly across the right hand side of the stationary cam 27, and at the same time the spring 29 shifts from one side of the pivot of the lever 24 to the other side, such shifting being due to the change of position of the lever 24. The instant the head 26 disengages the right hand side face of the cam 27, the spring 29 will actuate the lever 24 to move its head 26 across the bottom face of the cam 27 and to draw the link 23 to the right and thereby cause the connecting rod or bar 13 to simultaneously swing the arms 6 axially on their pivots 10 to move the fingers 7 from horizontal to depending vertical position. When the crank disk 19 makes the second half of its revolution and moves its pin in a forward and upward direction, the pitman 18 will be moved forwardly to cause the arms 17 to rock the shaft 12 in a forward direction and thereby swing the arms 6 downwardly, the fingers 7 on said arms remaining in their depending, vertical or perpendicular position just noted. When said crank disk begins the second half of its revolution the head 26 of the lever 24 is disposed in such position that the forward rocking movement of the shaft 12 will cause said head to travel upwardly across the left hand side of the stationary cam 27, and at the same time the change of position of the lever 24 with respect to the spring 29 will cause the latter to travel over the face 30 of said lever and onto the opposite side of the pivot of said lever, so that when the head 26 clears the left hand side face of the cam 27 the spring 29 will actuate the lever to cause said head 26 to travel to the right across the upper face of the cam 27. When the head 26 is thus moved across the upper face of the stationary cam, the arms 6 are in lowered position, so that when the connecting rod or bar 13 is actuated by such movement of the lever the fingers 7 will be swung from depending vertical position to horizontal position and will consequently move under any fallen grain and will be in position to lift such grain when the arms 6 are again elevated. It will be seen therefore that as the crank disk 19 rotates, the arms 6 will be swung upwardly when their fingers 7 are in horizontal position, that when said arms are elevated they will be swung axially to move their fingers 7 to depending vertical or perpendicular position, that when the fingers are in the last mentioned position the arms 6 will be swung downwardly, and that when in their lowered position said arms will be swung axially in an opposite direction to move the fingers 7 to horizontal position to bring them beneath the fallen grain which is to be lifted. Such operation of the arms is continuous during the forward movement of the machine, except when the gearing 22 is disconnected by means of the clutch 22$^b$.

Figures 2, 7, 11:
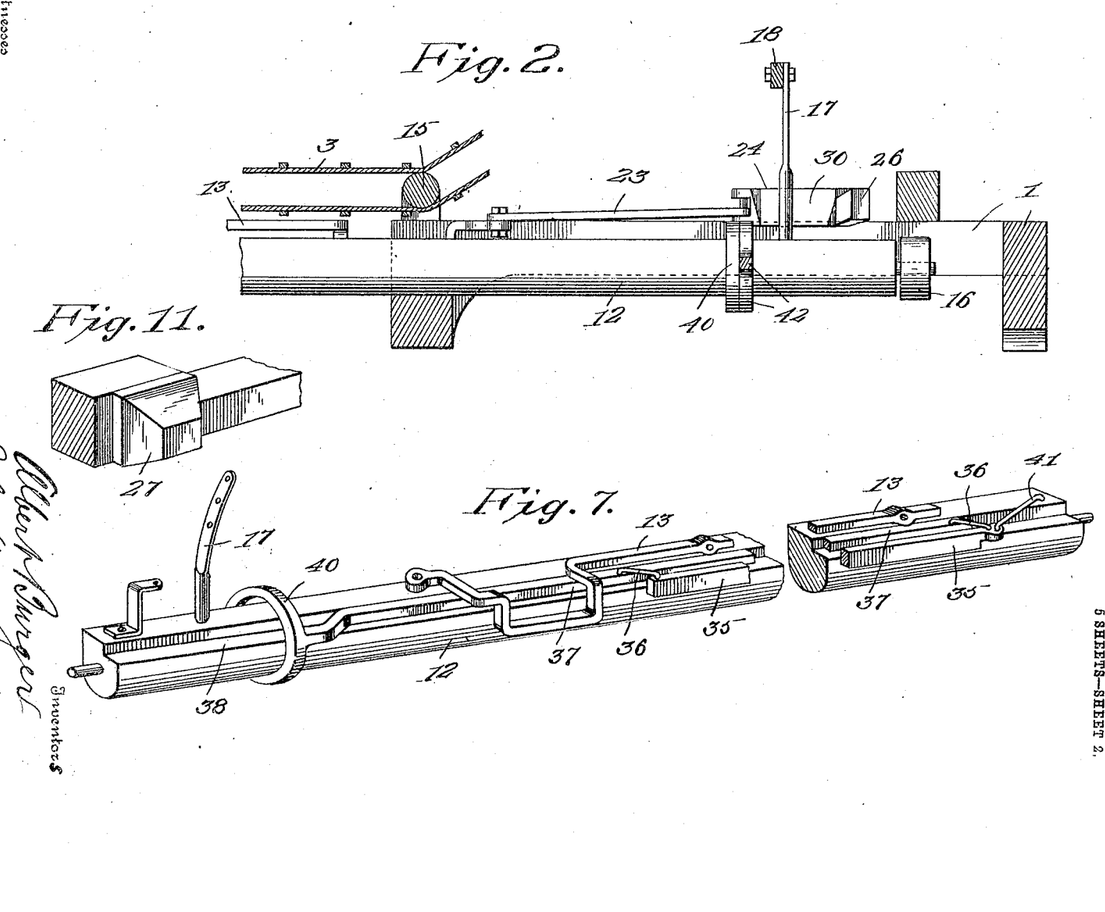
Fig. 2 is a vertical longitudinal section taken on the plane indicated by the line 2—2 in Fig. 1.
Fig. 7 is a detail perspective view of the rock shaft and certain parts mounted thereon.
Fig. 11 is a detail perspective view of the stationary cam.
Figure 3:
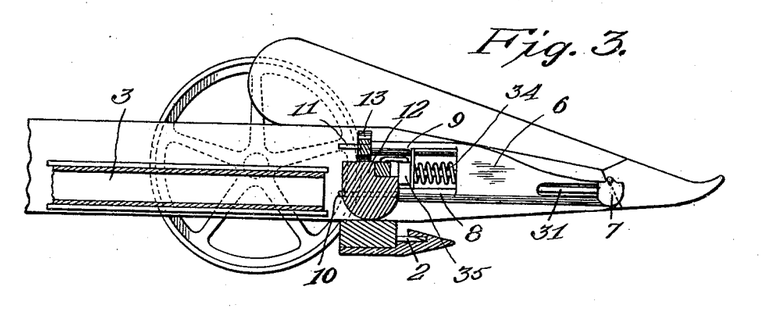
Figs. 3 and 4 are vertical cross sectional views taken on the planes indicated by the lines 3—3 and 4—4 in Fig. 1.
Figure 4:
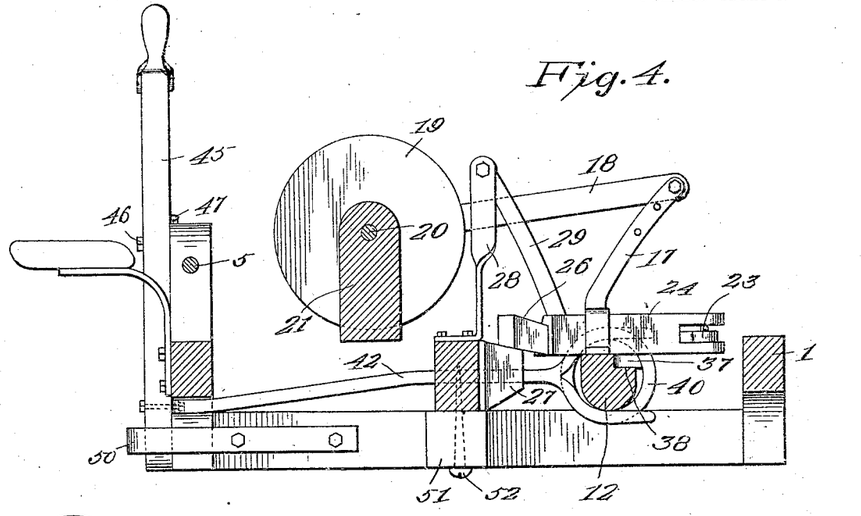
Figures 5, 6:
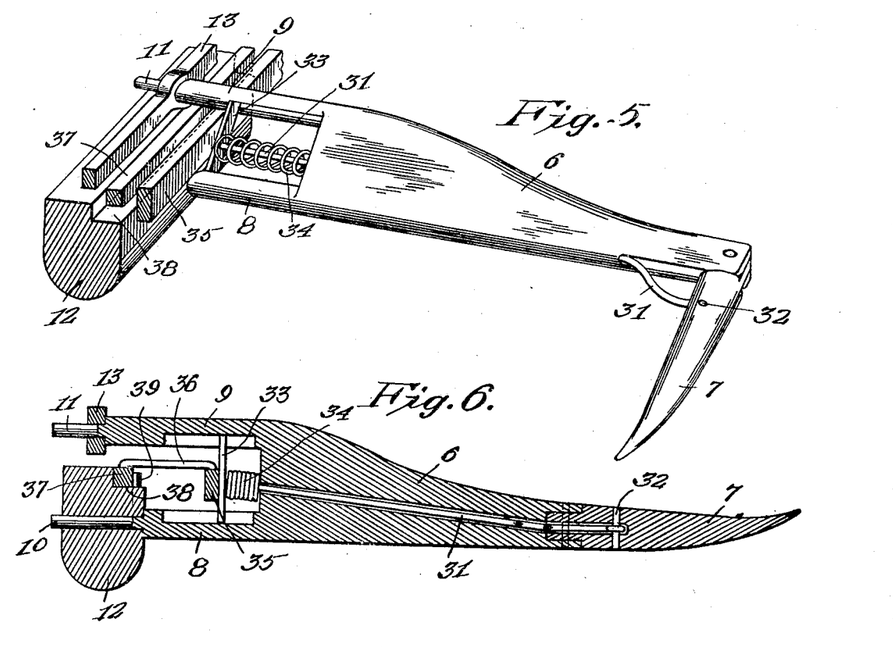
Fig. 5 is a perspective view of one of the grain lifting arms and its co-acting parts.
Fig. 6 is a longitudinal section through the same.
Figure 12:
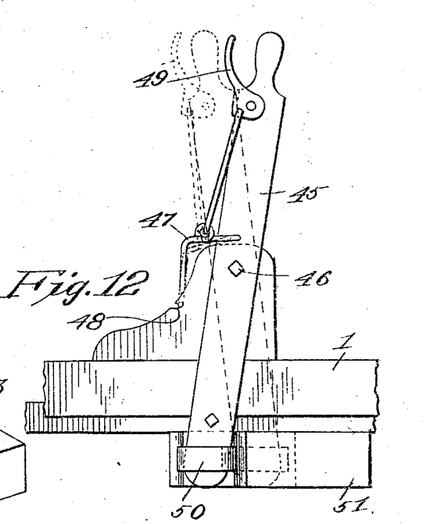
Fig. 12 is a detail view showing the controlling hand lever.
Figure 13:
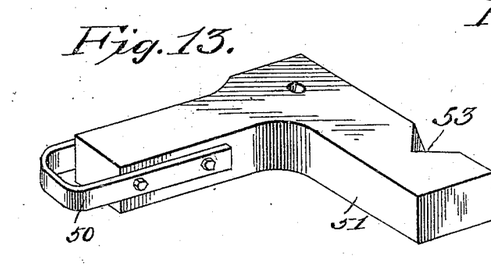
Fig. 13 is a detail perspective of the bell crank for locking the cam lever against movement.

For the purpose of enabling the machine to be effectively used on grain that has not fallen but which is straight or perpendicular, we provide means for moving the fingers 7 into longitudinal alinement with the arms 6, whereby the fingers form continuations of the arms and the latter are straight from end to end. To accomplish the last mentioned object, the fingers 7 have their inner ends suitably pivoted, as shown at 30, to the outer ends of the arms 6 and they are actuated by rods 31 arranged for sliding movement in the arms 6 and having their forward ends projecting laterally outside of said arms and offset and pivoted at 32 to the fingers 7. The inner ends of the rods 31 are connected to cross bars 33 arranged between the spaced portions 8, 9 of the inner ends of the arms 6 and having their ends slidably engaged with guide grooves in said portions 8, 9, as shown in the drawings. Coil springs 34 surround the inner ends of the rods 31 and are confined between the cross bars or heads 33 and the bottoms of the recesses in the rear ends of the arms 6 whereby the cross bars 33 and rods 31 are actuated rearwardly to maintain the fingers 7 in an angular position preferably at right angles to the arms 6. For the purpose of simultaneously projecting the fingers 7 outwardly into longitudinal alinement with the arms 6, a projecting bar 35 is arranged between the portions 8, 9 of the arms 6 and mounted for movement toward and from the shaft 12 in a plane parallel therewith. Said projecting bar 35 is adapted to engage and actuate the cross bars or heads 33 in an outward direction against the tension of the springs 34 and it is supported from the shaft 12 by means of two parallel links 36, the forward ends of which are pivotally mounted in said bar and the rear ends of which are similarly mounted in an operating bar 37 slidably arranged in a longitudinal groove or channel 38 formed in the upper and forward edge of the rock shaft 12. The operating bar 37 is slidably retained in its guide groove 38 by one or more guide pins 39 and also by a ring or loop 40 which is arranged transversely upon its inner end and which surrounds and slides upon the shaft 12. For the purpose of forcing the projecting bar 35 in a forward direction when the operating bar 37 is moved longitudinally of the shaft 12 in an outward direction, a link 41 is arranged between the outer ends of the projecting bar 35 and the rock shaft 12, as shown more clearly in Fig. 1. Said link 41 is disposed at a reverse or opposite angle to that of the parallel supporting links 36 and has its outer end pivotally mounted in the bar 35 and its inner end pivotally mounted in the shaft 12, as shown more clearly in Figs. 1 and 7 of the drawings. It will be seen that when the operating bar 37 is moved outwardly or to the left in Fig. 1 the links 36, 41 will cause the projecting bar 35 to move forwardly away from the shaft 12 and thereby project the rods 31 to cause the fingers 7 to be moved into longitudinal alinement with the arms 6, as shown in Fig. 6 of the drawings. While any suitable means may be provided for shifting the operating bar 37, we preferably provide a horizontally disposed forwardly and rearwardly projecting lever 42, the intermediate portion of which is pivoted at 43 upon the main frame. The forward end of the lever 42 is forked to straddle the rock shaft 12 and has a loose connection, indicated at 44, with the ring 40 on the bar 37. The rear end of the lever 42 is loosely pivoted to the lower portion of a controlling hand lever 45 fulcrumed intermediate its ends at 46 upon a bracket on the main frame. Any suitable means may be provided for locking the lever 45 in a position to retain the fingers 7 in longitudinal alinement with the arms 6 but as illustrated, it carries a pivoted dog or pawl 47 to engage a notch or seat 48 in the bearing bracket for said lever. Said dog 47 is adapted to be retracted by a hand piece 49 upon the upper handle end of the lever 45, as shown more clearly in Fig. 12 of the drawings. The lever 45 is also adapted to control means for locking the arms 6 in their elevated position so that when the fingers 7 are turned into longitudinal alinement with them, the invention will not interfere with the use of the machine in the ordinary manner upon grain that has not fallen. To lock or retain said arms 6 in their elevated position, the lower end of the lever 45 projects loosely into a loop 50 arranged on the rearwardly projecting arm of an angular lever or bell crank 51, which latter is fulcrumed at its angle, as shown at 52, upon the main frame and has its other end or arm adapted to swing under the stationary cam 27 and formed with a shoulder 53 to engage the head or end 26 of the lever 24 and prevent movement of said lever when it is in such position that the arms 6 are elevated or inclined upwardly. It will be understood that the clutch 22$^b$ is manipulated to disconnect the gearing 22 from the shaft 5 when it is desired to stop the movement of the arms 6 and retain them in elevated, inoperative position. It will be seen, therefore, that the lever 45 is adapted to not only control the straightening of the angular grain lifting arms, that is, to swing the fingers 7 of said arms into longitudinal alinement with the latter, but also to retain the arms 6 in elevated inoperative position when the machine is not operating upon fallen grain.

From the foregoing description taken in connection with the drawings it is thought that the construction, operation and advantages of the invention will be readily understood.

While the invention is preferably in the form of an attachment which may be readily applied to mowing machines now in general use, it will be understood that it may be built in the machine during its course of manufacture and form an integral part therewith. It will be further understood that while the preferred embodiment of the invention has been shown and described in detail, various changes in the form, proportion and arrangement of parts and in the details of construction may be resorted to without departing from the spirit and scope of the invention.

Having thus described the invention what is claimed is:

1. In a harvester, the combination of a rock shaft, grain lifting arms carried by the same and mounted for axial swinging movement, means connecting said arms for simultaneous axial swinging movement, a lever fulcrumed intermediate its ends on said rock shaft and having one end operatively connected to said connecting means, a stationary cam having a plurality of faces and around which the other end of said lever is adapted to travel, and a spring bearing upon said lever and adapted to actuate it when it disengages said cam.

2. In a harvester, the combination with a cutting mechanism, of a rock shaft arranged longitudinally above the cutting mechanism, forwardly projecting grain lifting arms pivoted for axial swinging movement in the rock shaft, means connecting said arms for said axial swinging movement, fingers pivotally mounted on the outer ends of said arms, a lever fulcrumed intermediate its ends on said rock shaft and having one end operatively connected to said connecting means, a stationary cam having a plurality of faces and around which the other end of said lever is adapted to travel, a spring bearing on said lever and adapted to actuate it when it disengages said cam, and means for simultaneously swinging said fingers on their pivots.

3. In a harvester, the combination with a cutting mechanism, of a rock shaft arranged longitudinally above the cutting mechanism, forwardly projecting grain lifting arms pivoted for axial swinging movement in the rock shaft, means connecting said arms for said axial swinging movement, fingers pivotally mounted on the outer ends of said arms, a lever fulcrumed intermediate its ends on said rock shaft and having one end operatively connected to said connecting means, a stationary cam having a plurality of faces and around which the other end of said lever is adapted to travel, a spring bearing on said lever and adapted to actuate it when it disengages said cam, means for simultaneously swinging said fingers on their pivots, means for rocking said shaft, means for rendering the last mentioned means inoperative, and means for maintaining the arms in elevated position.

4. The combination with a cutting mechanism, of a grain lifting mechanism arranged above and in advance of the cutting mechanism and comprising angular arms projecting forwardly from the cutting mechanism and mounted for simultaneous axial oscillation and vertical swinging movement, and means whereby said angular arms may be straightened and maintained in such straightened position.

5. The combination with a cutting mechanism, of a horizontal rock shaft arranged close to and above the cutting mechanism, a row of radially projecting vertically oscillating arms mounted in said rock shaft and having angular forward ends to engage and lift fallen grain, means connecting said row of arms for simultaneous oscillatory movement, means for rocking said shaft, a stationary cam, a spring actuated means operated by said rock shaft and adapted to coact with said cam, and a connection between the last mentioned means and said arm connecting means.

6. The combination with a cutting mechanism, of grain lifting mechanism comprising a rock shaft disposed close to and above the cutting mechanism and mounted for oscillatory movement, forwardly projecting, vertically swinging arms having their rear portions pivotally mounted in said rock shaft and their forward ends provided with grain engaging and lifting means, means connecting said arms for simultaneous oscillatory movement, means for oscillating said rock shaft to swing said arms alternately in upward and downward directions while they project forwardly from above the cutting mechanism, means for rendering said operating means inoperative, a stationary cam, a lever fulcrumed intermediate its ends and having one end operatively connected to said connecting means uniting the arms, the other end of said lever being adapted to travel around said cam and a spring for actuating said lever when the latter disengages said cam.

7. The combination of a rock shaft, a lever fulcrumed thereon, a stationary cam adapted to be engaged by said lever, a spring for acting on said lever, means for rocking said shaft, vertically oscillating grain lifting arms actuated by said shaft, means connecting said arms for axial oscillation, and means connecting the last mentioned means to said lever.

8. The combination with a cutting mechanism, of a rock shaft, forwardly projecting arms mounted in said rock shaft for axial oscillation, means for rocking said shaft, a connecting means connecting said arms for simultaneous axial movement, means for operating said connecting means, grain engaging fingers pivoted upon said arms, and means for moving said fingers into longitudinal alinement with their arms.

9. The combination with a cutting mechanism, of a rock shaft arranged longitudinally above the same, forwardly projecting arms provided at their rear ends with spaced pivots, one pivot on each arm being arranged in said rock shaft, whereby the arms are mounted for axial oscillation, a connecting rod uniting the other pivots of said arms whereby the latter are connected for simultaneous movement, means upon the outer portions of said arms for engaging and lifting fallen grain, means for rocking said shaft, a cam, a lever to co-act with said cam and operatively connected to said connecting rod and a spring to act on said lever.

10. The combination with a cutting mechanism, of a rock shaft arranged longitudinally above the same, forwardly projecting arms provided at their rear ends with spaced pivots, one pivot on each arm being arranged in said rock shaft, whereby the arms are mounted for axial oscillation, a connecting rod uniting the other pivots of said arms whereby the latter are connected for simultaneous movement, means carried by the outer portions of said arms for engaging and lifting fallen grain, means for reciprocating said connecting rod, a crank upon said rock shaft, a crank shaft, a pitman connecting said crank to the crank upon the rock shaft and means for rotating said crank shaft.

11. The combination with a cutting mechanism, of a rock shaft arranged longitudinally above the same, forwardly projecting arms provided at their rear ends with spaced pivots, one pivot on each arm being arranged in said rock shaft, whereby the arms are mounted for axial oscillation, a connecting rod uniting the other pivots of said arms whereby the latter are connected for simultaneous movement, means for rocking said shaft, means for reciprocating said connecting rod, fingers pivoted to the outer portions of said arms for engaging and lifting fallen grain, and means whereby said fingers may be moved into longitudinal alinement with the arms or at angles thereto and secured in adjusted position.

12. The combination with a cutting mechanism, of a rock shaft arranged longitudinally above the same, forwardly projecting arms provided at their rear ends with spaced pivots, one pivot on each arm being arranged in said rock shaft, whereby the arms are mounted for axial oscillation, a connecting rod uniting the other pivots of said arms whereby the latter are connected for simultaneous movement, means for rocking said shaft, means for reciprocating said connecting rod, fingers pivoted to the outer portions of said arms for engaging and lifting fallen grain, operating rods for said pivoted fingers, springs for actuating said operating rods to move the fingers to angular positions with respect to the arms, and means for simultaneously projecting the finger operating rods and retaining them in projected position.

13. The combination with a cutting mechanism of a rock shaft arranged longitudinally above the same, forwardly projecting arms provided at their rear ends with spaced pivots, one pivot on each arm being arranged in said rock shaft, whereby the arms are mounted for axial oscillation, a connecting rod uniting the other pivots of said arms whereby the latter are connected for simultaneous movement, means for rocking said shaft, means for reciprocating said connecting rod, fingers pivoted to the outer portions of said arms for engaging and lifting fallen grain, operating rods for said pivoted fingers, springs for actuating said operating rods to move the fingers to angular positions with respect to the arms, a longitudinal projecting rod carried by the rock shaft and movable toward and from the same in parallel relation thereto, said projecting rod being adapted to engage and actuate the finger operating rods and means for projecting said projecting rod and retaining it in projected position.

14. The combination with a cutting mechanism, of a rock shaft arranged longitudinally above the same, forwardly projecting arms provided at their rear ends with spaced pivots, one pivot on each arm being arranged in said rock shaft, whereby the arms are mounted for axial oscillation, a connecting rod uniting the other pivots of said arms whereby the latter are connected for simultaneous movement, means for rocking said shaft, means for reciprocating said connecting rod, fingers pivoted to the outer portions of said arms for engaging and lifting fallen grain, operating rods for said pivoted fingers, springs for actuating said operating rods to move the fingers to angular positions with respect to the arms, a longitudinal projecting rod carried by the rock shaft and movable toward and from the same in parallel relation thereto, said projecting rod being adapted to engage and actuate the finger operating rods, a slidable operating bar upon the rock shaft, parallel links connecting said operating bar to said projecting bar, a link connecting said projecting bar to said rock shaft, a lever for actuating said operating bar, a controlling lever for operating the last mentioned lever and means for locking said controlling lever in adjusted position.

15. The combination with a cutting mechanism, of a rock shaft arranged longitudinally above the same, forwardly projecting arms provided at their rear ends with spaced pivots, one pivot on each arm being arranged in said rock shaft, whereby the arms are mounted for axial oscillation, a connecting rod uniting the other pivots of said arms whereby the latter are connected for simultaneous movement, means for rocking said shaft, a lever pivoted intermediate its ends to the rock shaft and having one end loosely connected to said connecting rod and its other end provided with a head, a stationary cam to coact with the head on said lever, a spring for actuating said lever, fingers pivoted to the outer portions of said arms for engaging and lifting fallen grain, means for projecting said fingers into longitudinal alinement with their arms, means to engage said lever to limit its movement and means for simultaneously actuating the last mentioned means and said finger projecting means.

16. The combination with a cutting mechanism of a rock shaft arranged longitudinally above the same, forwardly projecting arms provided at their rear ends with spaced pivots, one pivot on each arm being arranged in said rock shaft, whereby the arms are mounted for axial oscillation, a connecting rod uniting the other pivots of said arms whereby the latter are connected for simultaneous movement, means for rocking said shaft, a lever pivoted intermediate its ends to the rock shaft and having one end loosely connected to said connecting rod and its other end provided with a head, a stationary cam to co-act with the head on said lever, a spring for actuating said lever, fingers pivoted to the outer portions of said arms for engaging and lifting fallen grain, operating rods for said pivoted fingers, springs for actuating the last mentioned operating rods to move said fingers to angular positions with respect to the arms, a longitudinal operating bar carried by the rock shaft and movable toward and from the same in parallel relation therewith to actuate said finger operating rods, a lever means actuated by the latter for operating said longitudinal bar, a lever movable into the path of the head on the first mentioned lever, a controlling lever for simultaneously actuating the two last mentioned levers and means for locking said controlling lever in adjusted position.

17. In a harvester grain lifting mechanism including oscillatory arms means for supporting and actuating said arms, a finger pivotally mounted on each of said arms for swinging movement independent of the latter, said fingers being disposed normally at right angles to said arms and means for moving said fingers on their pivots into longitudinal alinement with said arms.

18. The combination with a cutting mechanism of a grain lifting mechanism arranged above and projecting in advance of the same, said lifting mechanism including angular arms mounted for vertical swinging movement and simultaneous axial oscillatory movement, means for swinging said arms vertically, means for rendering the last mentioned means inoperative, means for oscillating said arms simultaneously on their axes, the last mentioned means including a lever, a stationary cam around which said lever is adapted to travel and a spring engaged with said lever adapted to actuate the same when it disengages said cam.

19. The combination with a cutting mechanism, of a grain lifting mechanism comprising forwardly projecting and vertically swinging arms, means carried by said arms for engaging and lifting grain and means for holding said arms elevated in an inoperative position.

20. The combination with a cutting mechanism, of a grain lifting mechanism, comprising forwardly projecting and vertically swinging arms, grain lifting fingers projecting angularly from said arms, and movable into longitudinal alinement with the latter, means for moving said fingers into longitudinal alinement with their arms and means for retaining said arms in elevated inoperative position.

21. The combination with a cutting mechanism, of a grain lifting mechanism comprising forwardly projecting and vertically swinging arms, grain lifting fingers projecting angularly from said arms, and movable into longitudinal alinement with the latter, and means for simultaneously projecting the fingers into longitudinal alinement with their arms and retaining said arms in elevated inoperative position.

22. The combination with a cutting mechanism, of a rock shaft arranged longitudinally above the same, forwardly projecting arms pivoted for axial movement in said rock shaft, means for rocking said shaft, a connecting bar uniting said arms for simultaneous oscillation, angularly extending grain lifting fingers upon said arms, a lever pivoted intermediate its ends upon the rock shaft and having one end loosely connected to said rod, a stationary cam to coact with the other end of said lever, a spring for actuating said lever and means to engage said lever to hold it against movement and retain said arms in elevated position.

In testimony whereof we hereunto affix our signatures in the presence of two witnesses.

ALBERT BURGER.
     JOHN GOMINSKY.

Witnesses:
 E. ENDERLE,
 EDWIN EHLERS.